United States Patent Office 2,741,630
Patented Apr. 10, 1956

2,741,630

PROCESS FOR PREPARING ALKYLPOLY-
SILOXANES

Charles E. Reed, Waterford, N. Y., and John M. Tome, Pittsfield, Mass., assignors to General Electric Company, a corporation of New York No Drawing. Application March 17, 1955,
Serial No. 495,053

5 Claims. (Cl. 260—448.2)

This invention is concerned with a method for the production of alkyl polysiloxanes from dialkyldihalogenosilanes. More particularly, the invention relates to a process for making alkylpolysiloxanes, particularly cyclic dialkylpolysiloxanes in good yields, from monomeric dialkyldihalogenosilanes, for instance, dimethyldichlorosilane, which process comprises reacting a dialkyldihalogenosilane with an alkanol, e. g., methanol, under substantially anhydrous conditions in the vapor phase at a temperature of at least 175° C. in the presence of a zinc halide as a catalyst.

Methylpolysiloxanes have been prepared in the past by effecting reaction between alkylhalogenosilanes and water. however, under such circumstances, the hydrogen halide formed as a result of the reaction is corrosive and often exercises an undesirable effect on the alkylpolysiloxanes formed unless provision is made for rapid removal of the hydrogen chloride or reducing the activity of the hydrogen halide by means of high dilution with water or by neutralization in the hydrolysis medium. In addition, when employing such hydrolysis techniques, it is often difficult to remove the last traces of hydrogen halide from the alkylpolysiloxane so that undesirable effects of the presence of the hydrogen halide are obtained during later processing of the alkylpolysiloxane. Moreover, the hydrolysis reaction is often violent and difficult to control, and has required modification, for instance, by carrying out the hydrolysis in two or more stages, or else employing expensive and toxic solvents.

U. S. Patent 2,556,897, issued June 12, 1951, attempts to correct some of these difficulties by effecting reaction between an alkylhalogenosilane and a lower alkanol, such as methanol, whereby part of the product formed is an alkyl halide yielding the desired alkylpolysiloxane, for instance, the methylpolysiloxane. However, in this patent, it is stated that the temperature of the reaction should be below 60° C. in order to avoid undesirable liberated amounts of hydrogen halide. However, the conditions under which this reaction is carried out are not conducive to useful processing for several reasons. In the first place, the material balance, i. e., the desirable alkylpolysiloxanes, such as the methylpolysiloxanes, formed, are not produced in good enough yield and the yield of alkyl halide which is expected as a result of the reaction is undesirably poor. Moreover, the time of reaction is unduly long, as evidenced by the fact that the single example cited in this patent states that, after 5 hours, only half the theoretical quantity of alkyl halide had been liberated. Furthermore, contrary to the statement in the patent, it has been found that large amounts of hydrogen halide are still present in the reaction mixture, which requires careful removal or neutralization and also this reaction gives poorer yields of the desired product than is indicated in the patent.

We have now discovered that we can obtain improved yields of alkylpolysiloxanes [e. g., cyclic derivatives of the formula $(R_2SiO)_n$ where R is a lower alkyl radical, for instance, methyl, ethyl, propyl, etc., and $n$ is an integer equal to from 3 to 8 or more] over those described in the aforementioned U. S. Patent 2,556,897, that such yields can be obtained in relatively short periods of time, that the conversion of the reaction products to the useful alkyl halide which can be re-used, for instance, in making fresh alkylhalogenosilanes can be materially increased, and the amount of hydrogen halide present in the reaction zone or in the reaction mixture greatly reduced and, in some respects, substantially eliminated. All these desirable results are accomplished by effecting reaction between the dialkyldihalogenosilane and the alkanol in the vapor phase at a temperature above 175° C. in the presence of a zinc halide, for instance, zinc chloride ($ZnCl_2$) as the catalyst. Amongthe dialkyldihalogenosilanes that may be employed in the practice of the present invention are, for instance, dimethyldichlorosilane, diethyldichlorosilane, dipropyldichlorosilane, dimethyldibromosilane, etc. Preferably, the alkyl group of the dialkyldihalogenosilane contains from 1 to 2 carbon atoms and the halogen is chlorine.

The alkanol used for reaction with the dialkyldihalogenosilane is selected from the lower alkyl monohydric alcohols, as, for instance, methanol, ethanol, propanol. Preferably, the alcohol is methyl alcohol when used with dimethyldichlorosilane, and ethyl alcohol when used with diethyldichlorosilane, because of the fact that the formed alkyl halide, for instance, methyl chloride when using methanol and ethyl chloride when using ethanol, can be employed for passage over silicon in the presence of copper to form new amounts of the corresponding dialkyldichlorosilane in accordance with the process described in Rochow patent 2,380,995 issued August 7, 1945 and assigned to the same assignee as the present invention.

The proportion of alkanol to dialkyldihalogenosilane is critical if one is to obtain optimum yields of the alkylpolysiloxane and the alkyl halide. We have found that the concurrent passage of the alkanol and the dialkyldihalogenosilane through the heated zone in the presence of the zinc halide catalyst is preferably carried out under conditions wherein there are present from about 2 to 3.5 mols methanol per mol of the dialkyldihalogenosilane. Preferably, at reaction temperatures of from about 250° to 375° C., ratios from 2.5 to 3 mols of methanol per mol of dimethyldichlorosilane are advantageously employed.

The temperature at which the reaction is carried out is advantageously maintained at a temperature of from about 175° to 400° C. If temperatures below 175° C. are used, it will be found that although the yield of desirable alkylpolysiloxane products may be the same, the percentage conversion to the alkyl halide, for instance, methyl chloride, will be lower, while large amounts of hydrogen halide will be found in the reaction product. Optimum temperature ranges are from about 250° to 375° C. The upper temperature limit should be below that at which undesirable decomposition of either the reaction products or the reaction ingredients occurs.

The preferred catalyst is zinc chloride, although any zinc halide may be employed. However, it is desirable to employ a zinc halide containing the same halogen as is in the dialkyldihalogenosilane. The carrier for the zinc halide is preferably a silica gel, for example, a silica gel identified as activated silica gel sold by Davison Chemical Corporation, Baltimore, Maryland. This silica gel is an amorphous, extremely porous form of silica having the appearance of clear, crushed quartz. It has a high adsorptive capacity for gases and liquids. It may have a surface area range of from 100 to 850 square meters/ gram, a pore diameter range of from 10 to 100 Angstrom units, and a particle density of 1.20. It can be prepared by adding $H_2SO_4$ to an aqueous solution of sodium silicate, to give a gel which is preferably washed to remove sodium sulfate, and then dried to give the silica gel.

The amount of zinc halide in combination with this silica gel may range widely and is preferably within the range from about 2 to 50 per cent, by weight, based on the total weight of the silica gel and zinc halide. Amounts of zinc chloride in excess of 30 per cent, by weight, of the total weight of the zinc halide and the silica gel do not show any significant improvement over cases where the zinc halide is below 30 per cent, by weight. Use of the zinc halide in the lower ranges, although giving acceptable alkylpolysiloxane formation, nevertheless may give lower alkyl halide conversion than is obtainable with the higher amounts of the zinc halide.

Although the zinc halide in moist form may be mixed together with the silica gel, and this dried and employed as a bed over which the vapors of the alkanol and the dialkyldihalogenosilane pass, a more advantageous method comprises dissolving the zinc halide in water and mixing the zinc halide solution with silica gel to intimately disperse in a homogeneous manner the zinc chloride over the silica gel, and thereafter drying the mixture to remove substantially all traces of moisture so that, under reaction conditions, substantially anhydrous conditions are employed.

In carrying out the reaction, the zinc halide and silica gel are packed into a reaction tube which may or may not be preceded by an inactive bed of finely divided materials (which acts as a volatilizing zone), for instance, finely divided glass beads, etc. Thereafter, the alkanol and the dialkyldihalogenosilane vapors are passed through the catalyst bed of the zinc halide-silica gel mixture, maintaining at all times the desired temperature range in the reaction zone. Thereafter, the reaction products as well as unreacted materials may be led into suitable condensing traps maintained at various temperatures designed to effect either solidification or liquefaction of the reaction products or reaction ingredients.

In order that those skilled in the art may better understand how the present invention may be practiced, the following examples are given by way of illustration and not by way of limitation. All parts are by weight.

In the following examples, the dialkyldihalogenosilane employed was dimethyldichlorosilane, and the alkanol was methanol. The silica gel-zinc halide catalyst bed was prepared by dissolving zinc chloride in water in such amounts that when the zinc chloride-water solution was mixed with activated silica gel and the mixture of ingredients dried to remove substantially all the water, there was deposited on the activated silica gel (Davison silica gel of about 8 to 14 mesh) in a homogeneous fashion the recited amount of zinc chloride.

The reaction zone comprised a one-inch diameter Pyrex glass tube containing consecutively a 12-inch section packed with 5 mm. glass beads maintained at the stipulated temperature as a vaporizer preheat unit, and a 40-inch section of catalyst bed maintained again at the requisite temperature for reaction as the reaction site. The exit reaction products were cooled with a water condenser and those condensed were retained by the receiver while those still volatile at room temperature were collected in a Dry Ice-isopropanol trap system. Liquid methanol and dimethyldichlorosilane were fed with rates controlled by Sigmamotor pumps, E and M Enterprises, Inc., Middleport, N. Y., into the heated portion of the glass tube containing the glass beads.

In these examples, the water-condensable products consisted of a layer of methylpolysiloxane and a layer consisting of water, excess methanol and some dissolved hydrogen chloride. The methylpolysiloxane layer was separated and washed with water and the yield of methylpolysiloxane determined.

EXAMPLE 1

In this example, mixtures of vaporized dimethyldichlorosilane and methanol were passed in various proportions over silica gel impregnated with varying amounts of zinc chloride in the manner described above. As controls, similar passages of methanol and dimethyldichlorosilane were made over the silica gel which did not contain any zinc chloride and over silica gel containing another material which might be considered a catalyst, such as calcium oxide. Several of the runs carried out were maintained at different temperatures to determine the effect of temperature change. The following Table I shows the ingredients used, the proportion of such ingredients, the temperature conditions, and the amounts of product obtained. The vapors of the methanol and dimethyldichlorosilane were passed through the respective beds within a space of about 100 to 130 minutes.

*Table 1*

| | Run Number | | | | | | | |
|---|---|---|---|---|---|---|---|---|
| | 1 | 2 | 3 | 4 | 5 | 6 | 7 | 8 |
| Temperature | 300° C. | 300° C. | 300° C. | 225° C. | 300° C. | 375° C. | 300° C. | 300° C. |
| Catalyst | Silica gel alone | Silica gel 10% CaO | Silica gel 10% ZnCl$_2$ | Silica gel 10% ZnCl$_2$ | Silica gel 20% ZnCl$_2$ | Silica gel 20% ZnCl$_2$ | Silica gel 20% ZnCl$_2$ | Silica gel 28% ZnCl$_2$ |
| Reactants: | | | | | | | | |
| Moles Used (CH$_3$)$_2$SiCl$_2$ | 2.18 | 1.98 | 1.88 | 1.83 | 2.04 | 1.63 | 2.98 | 2.22 |
| Moles CH$_3$OH | 7.33 | 5.92 | 5.31 | 5.09 | 6.62 | 4.94 | 6.18 | 6.28 |
| Moles ratio | 3.35/1 | 2.99/1 | 2.82/1 | 2.78/1 | 3.24/1 | 2.94/1 | 2.08/1 | 2.82/1 |
| Time of run (minutes) | 130 | 100 | 100 | 100 | 130 | 120 | 120 | 120 |
| Products: | | | | | | | | |
| Methylpolysiloxane (grams) | 85.5 | 67.9 | 88.9 | 118.3 | 131.9 | 97.7 | 208.6 | 160.1 |
| Percent recovery of silicon as methylpolysiloxane | 53.7 | 46.4 | 63.8 | 87.5 | 87.3 | 81 | 94.77 | 97.3 |
| Moles unreacted Si-Cl | 1.01 | 0.51 | 0.01 | 0.05 | 0.008 | 0.008 | 0.24 | 0 |
| Moles CH$_3$Cl formed | 0.96 | 1.01 | 2.03 | 1.47 | 1.88 | 1.76 | 2.27 | 3.48 |
| Percent CH$_3$Cl (of theoretical) | 22 | 25.6 | 54.2 | 40.2 | 46.1 | 54 | 38.1 | 78.4 |

It will be apparent from the above-mentioned described table that increasing the amount of zinc chloride as catalyst increases the yield of methyl chloride, indicating that greater theoretical conversion of the dimethyldichlorosilane to the methylpolysiloxane was being effected. Along these lines, it was found that when the catalyst concentration was increased to 30 per cent, or in another instance to 50 per cent, the results were essentially the same as those obtained by using 28 per cent zinc chloride. Further observation is the fact that decreasing the temperature from 300° C. to 225° C. had little effect on the methylpolysiloxane recovery but decreased the methyl chloride formation. Increasing the temperature from 300° C. to 375° C. had the reverse effect, that is, although it lowered somewhat the yield of methylpolysiloxanes, nevertheless the methyl chloride production was increased; however, this also resulted in increased formation of dimethyl ether and increased amounts of pyrolysis products of the methylpolysiloxane due to the elevated temperatures.

It is desired to point out that a significant amount (approximately 15 to 30 per cent) of the chlorine from the reaction appears as hydrogen chloride in a methanol-water phase as a condensation product of the exit reaction gases. It was found that by recycling this liquid phase over an alumina ($Al_2O_3$) catalyst reactor, excellent recoveries of methyl chloride were obtained as long as there was no methylpolysiloxane present. Recycling this hydrogen chloride-methanol-water over silica gel containing 20 per cent zinc chloride at 300° C. gave a chlorine conversion of hydrogen chloride to methyl chloride of about 70 per cent. This methyl chloride can then be reacted anew with silicon in the presence of copper to form additional amounts of dimethyldichlorosilane employed in the preparation of the alkylpolysiloxane in accordance with the process described in the present application.

The methylpolysiloxanes obtained in accordance with the directions in the above-identified example comprise about 50 per cent, by weight of cyclic polydimethylsiloxanes, for instance, hexamethylcyclotrisiloxane, octamethylcyclotetrasiloxane, decamethylcyclopentasiloxane, etc. The remainder of the methylpolysiloxane product constitutes higher molecular weight materials than the aforesaid cyclic derivatives and may contain small amounts of intercondensed monomethylsiloxane units ($CH_3SiO$).

The results described in the foregoing example should be contrasted with those obtained by heating a mixture composed of 2 mols of methyl alcohol and 1 mol of dimethyldichlorosilane at the reflux temperature of the mass. Contrary to what might be expected, large amounts of hydrogen chloride were removed but no evidence of methyl chloride formation was noticed.

It will, of course, be apparent to those skilled in the art that other dialkyldihalogenosilanes, many examples of which were mentioned above, as well as other alkanols, may be used in place of those employed in the foregoing example without departing from the scope of the invention. In addition, the catalyst concentration may be varied within wide limits and the temperature of reaction, as well as the molar concentration of the reactants, may be varied within the scope recited previously. The type of activated silica gel may also obviously be varied; and activated silica gels such as those used for gas adsorption or drying agents, as refrigeration dryers, those used in protective packaging, etc. may be employed for the purpose.

The alkylpolysiloxanes, particularly the cyclic polydialkylsiloxanes, obtained in accordance with the practice of the present invention may be employed in various applications, for instance, as lubricants, or they can be used as intermediates in the preparation of various silicone oils, resins and rubbers. Thus, the cyclic polydimethylsiloxane, particularly the octamethylcyclotetrasiloxane, can be condensed with small amounts of the order of about 0.001 to 0.01 per cent, by weight thereof, of an alkali-metal hydroxide, such as potassium hydroxide at temperatures of from about 150° to 175° C. for times ranging from about 1 to 4 hours, to give a highly viscous methylpolysiloxane product which can be compounded with various fillers, for instance, silica aerogel, gamma alumina, titanium dioxide, etc., in amounts ranging from about 50 per cent or more of the weight of the methylpolysiloxane, and vulcanized, employing benzoyl peroxide as a vulcanizing agent to give elastomeric methylpolysiloxane products useful in applications requiring resistance to elevated temperatures for long periods of time and capable of maintaining flexibility at temperatures below —25° to —50° C. The methylpolysiloxane rubbers can be employed as gaskets. They also can be used to make silicone rubber nipples, etc.

Alternatively, the methylpolysiloxanes obtained in accordance with the practice of the present invention can be interacted with, for instance, hexamethyldisiloxane in the presence of small amounts of an alkali metal hydroxide to give organopolysiloxane fluids of a linear nature useful in hydraulic apparatus or as lubricants. The uses of the alkylpolysiloxanes prepared in accordance with the process of the present invention are well known and are readily ascertained in the periodicals and patent literature available in the art.

What we claim as new and desire to secure by Letters Patent of the United States is:

1. The process for making alkylpolysiloxanes which comprises simultaneously passing a dialkyldihalogenosilane and an alkanol, both in the vapor phase, over a catalyst bed composed of a zinc halide and silica gel while maintaining the temperature of the reaction above 175° C. and below the decomposition point of the reactants and the reaction products.

2. The process for making methylpolysiloxanes which comprises simultaneously passing dimethyldichlorosilane and methanol, both in the vapor phase, over a catalyst bed composed of zinc halide and silica gel while maintaining the temperature of the reaction between 175° C. to 400° C.

3. The process as in claim 2 in which zinc halide is zinc chloride.

4. The process for making ethylpolysiloxanes which comprises simultaneously passing diethyldichlorosilane and ethanol, both in the vapor phase, over a catalyst bed composed of zinc halide and silica gel while maintaining the temperature of the reaction between 175° and 400° C.

5. The process as in claim 4 in which the zinc halide is zinc chloride.

References Cited in the file of this patent

UNITED STATES PATENTS

| | | |
|---|---|---|
| 2,485,928 | Servais | Oct. 25, 1949 |
| 2,553,845 | Clark | May 22, 1951 |
| 2,556,897 | Bidaud | June 12, 1951 |
| 2,695,307 | Guillisen et al. | Nov. 23, 1954 |